United States Patent [19]

Heinen et al.

[11] Patent Number: 4,772,326
[45] Date of Patent: Sep. 20, 1988

[54] CARTRIDGES OF FAST SETTING CEMENT AND GELLED WATER

[75] Inventors: John Heinen, Wyckoff, N.J.; David S. Babcock, Old Greenwich, Conn.

[73] Assignee: Construction Products Research, Inc., Fairfield, Conn.

[21] Appl. No.: 9,080

[22] Filed: Jan. 27, 1987

Related U.S. Application Data

[63] Continuation-in-part of Ser. No. 834,693, Feb. 28, 1986, abandoned.

[51] Int. Cl.$^4$ ............................ C04B 7/00; C04B 9/04
[52] U.S. Cl. ......................................... 106/85; 106/91; 106/104; 106/106; 106/109; 106/121; 501/111; 206/219
[58] Field of Search .................... 106/85, 106, 121, 91, 106/104, 109; 501/111; 206/219, 568, 524.1

[56] References Cited

U.S. PATENT DOCUMENTS

| | | | |
|---|---|---|---|
| 3,821,006 | 6/1974 | Schwartz | 106/85 R |
| 3,879,209 | 4/1975 | Limes et al. | 106/85 X |
| 3,960,580 | 6/1976 | Stierli et al. | 106/85 X |
| 4,059,455 | 11/1977 | Limes et al. | 106/85 X |
| 4,096,944 | 6/1978 | Simpson | 106/96 X |
| 4,152,167 | 5/1979 | Horvitz et al. | 106/85 X |
| 4,262,055 | 4/1981 | Russell et al. | 106/85 X |
| 4,273,689 | 6/1981 | Smearing | 524/906 X |
| 4,324,592 | 4/1982 | Patel et al. | 106/85 R |
| 4,516,884 | 5/1985 | Douty | 206/219 X |

OTHER PUBLICATIONS

Henkel Corporation, SGP 104 Absorbent Polymer.
R. H. Karol, *Roc-Loc Package* (Engineering Chemicals) 6/67.
R. H. Karol, *Field Pull-Out Tests of Reinforcing Bars Grouted with Roc-Loc Mining Kits* (Cyanamid Engineering Chemicals) 2/21/66.
*Viterra 2 Hydrogel Soil Amendment*, Nepera Chemical Company, Inc. (1982).
Bethlehem Steel *Roof and Rock Bolts; Anchor Bolts, Foundation Hook (Wall Plate) Anchor Bolts; and Bent Bolts* (Fastener Facts-Bulletin No. 2117, May 1964; No. 21, Sep. 1964; No. 19, Oct. 1966).
Research News, USDA, Bulletin NC-266 dated 10/15/79.

Primary Examiner—Mark L. Bell
Assistant Examiner—Karl Group
Attorney, Agent, or Firm—Pennie & Edmonds

[57] ABSTRACT

Cartridges for securing an anchoring element in an aperture of a structure containing magnesium oxide ammonium phosphate and gelled or microencapsulated water.

33 Claims, 1 Drawing Sheet

CARTRIDGES OF FAST SETTING CEMENT AND GELLED WATER

This is a continuation-in-part of application Ser. No. 834,693, filed Feb. 28, 1986, now abandoned.

FIELD OF THE INVENTION

The present invention relates to the use of fast-setting cementitious compositions in combination with gelled water in cartridges for securing anchoring elements in or to various structures.

BACKGROUND OF THE INVENTION

Ordinarily, in the mixing and application of cements and mortar, it is important to provide a setting time which is sufficiently long to enable the mix to be poured or cast into a form or a desired shape. The setting time of the mix is sufficiently long to also enable the cement or mortar to be finished to the desired surface finish or texture.

For certain specific end uses, however, these prior art cements and mortars are not useful because their setting and curing times are too long. Certain uses, particularly those involving overhead or out-of-position pouring or casting require cements or mortars having a relatively quick setting time.

When agents are added to increase the setting time of these cements, or when other fast setting materials are employed, there often is not enough time mix and pour the material before it begins to set.

One particular application requiring fast setting materials involves the securing of anchoring elements, such as rock bolts, in or to walls or other structures, and is commonly employed in mines. Since prior art inorganic cements set relatively slowly, mixtures of hardening organic resins or other fast setting materials have been used for securing these anchors into boreholes in the mine wall.

An early practice involved the pre-mixing of the components of the resin followed by introduction of the resin and the bolt into the borehole. After curing, the hardened resin would hold the bolt in the borehole. Later techniques involved the utilization of a dual compartment cartridge, with each compartment separately storing the reactive components of the organic resin. Then the cartridge would be inserted into a previously drilled hole, followed by insertion of a bar. The ramming of the bar into the hole would thus break the cartridge and allow the components of the resin to mix. Since the polyester resin formulation set very rapidly, it developed the necessary holding power in a matter of minutes.

Prior art patents in this field disclose two compartment cartridge systems with one compartment containing a resin and the other compartment containing a hardener component. The frangible cartridge is ruptured by the force of the insertion of the anchor element into the borehole with the resin and hardening material being mixed by mechanical action. Exemplary patents in this field include U.S. Pat. Nos. 3,861,522 (Llewellyn et al.); 3,430,449 (Novotny et al.); 3,705,646 (Jankowski et al.); 3,731,791 (Fourcade et al.) and 3,921,800 (Burns).

The anchoring cartridge system discussed above has several major disadvantages. Because it contains an organic resin, the cartridge is hazardous in that it not only supports combustion, but actually fuels combustion should a fire occur in the mine. Furthermore, the flammability of the resins would destroy the holding capacity of the anchor and would result in the failure of the anchor in the event of a fire. In addition, these cartridges are relatively expensive.

For these reasons, fast-setting cementitious compositions have been sought for such securing of anchoring elements. U.S. Pat. No. 3,108,443 describes a two-compartment cartridge wherein one compartment contains dry cement and the other compartment contains water. The components are designed to mix upon the breaking of the cartridge. Due to the slow setting of the mix, however, there is a great tendency of the water to flow out of the borehole. Thus, uneven mixing results which in turn provides unsatisfactory holding power.

One method for curing this defect is disclosed by U.S. Pat. No. 4,096,944 (Simpson) wherein a hydraulic cement powder is enclosed in a frangible casing. A multitude of water containing microcapsules are uniformly dispersed throughout the cement powder. These microcapsules of water, however, are relatively difficult to produce and maintain in the cartridge.

Applicants have now discovered cement compositions which set and cure rapidly. When used in the above-described cartridges, these composition provide a suitable method for securing mine bolts to walls, ceilings and floors. In comparison to the Simpson patent, the present invention greatly simplifies the manufacture of the cartridge in that the micro-encapsulation of water is not required. The present invention also overcomes the disadvantages of prior art organic resin cartridges in that such composition are not flammable.

SUMMARY OF THE INVENTION

The present invention relates to a cartridge for securing an anchor element in an aperture of a structure which comprises a casing of a frangible material having two compartments, one of which contains a cementitious composition and the other containing gelled water.

The cementitious composition of the invention may include ordinary cementitious mixtures with the addition of an accelerator to cause such composition to be fast-setting i.e., to set within a time period of between about 25 seconds and 10 minutes, perferably between about 2 and 5 minutes. Also, it is possible to utilize fast-setting cementitious compositions of magnesium phosphate, high alumina cement, gypsum, portland cement, or mixtures thereof without the necessity of an accelerator.

The invention also relates to a cementitious composition comprising monoammonium phosphate, magnesium oxide, and water. Preferably, the relative amounts of these components are such that the resulting mixture sets in between about 25 seconds and 10 minutes.

The preferred relative amounts of magnesium oxide to monoammonium phosphate ranges from about 4:1 to 1:2 by weight. Also, it is most advantageous for the relative amounts to be such that the mixture sets between about 2 and 5 minutes.

In the cementitious compositions of the invention, the magnesium oxide and monoammonium phosphate are each in the form of a finely ground powder, i.e., of a particle size which passes through #200 mesh. The water component can be microencapsulated, if desired. Also, the cementitious compositions may further comprise particulates, aggregates, fillers or mixtures thereof.

Another embodiment of the invention relates to a cartridge for securing an anchor element in an aperture of a structure which comprises a casing of frangible material comprising at least two separate compartments at least one of which contains a sufficient amount of monoammonium phosphate and magnesium oxide, and at least one of which contains water.

The water preferably is in the form of gelled water, i.e.—a mixture of water and a protein product. When used in this manner, the water may further comprise a sufficient amount of a bactericide and/or fungicide compound to prevent the growth of microorganisms therein.

An alternate cartridge for securing an anchoring element in an aperture of a structure comprises a casing of frangible material containing monoammonium phosphate, magnesium oxide and microencapsulated water. it is also possible to fill the casing with magnesium oxide and a microencapsulated monoammonium phosphate/water solution.

An alternate embodiment of this invention includes the method of providing an aperture in a structure, configuring one of the cartridges described previously to a suitable size to fit into the aperture, inserting the cartridge into the aperture, inserting an anchoring element into the aperture to break, puncture, crush, destroy or dissolve the cartridge, thus allowing the components in the cartridge to mix, and allowing the mixture to cure and securely attach the anchoring element to the structure.

BRIEF DESCRIPTION OF THE DRAWINGS

The nature, advantages, and various other additional features of the invention will appear more fully upon consideration of the preferred embodiments of the invention which are described in detail in connection with the accompanying drawing figures, wherein.

DETAILED DESCRIPTION OF THE PREFERRED EMBODIMENTS

The present invention is directed to fast setting cementitious mixtures, the most preferred of which is a mixture of monoammomium phosphate, magnesium oxide and gelled water which can used in a variety of applications. Preferably, the mixture will set in about 25 seconds to 5 minutes to a hard, strong cement which enables a surface to be exposed to traffic relatively quickly. Also, these compositions can be used to achieve rapid attachment of anchoring members such as bolts, studs, or other component, in or to a structure, such as a wall, floor, rock formation, or the like, in any position, i.e. or overhead, vertical or horizontal surfaces.

The invention utilizes powdered magnesium oxide of a high purity technical grade processed from magnesium-rich brine. These granular grades are essentially dust free. The magnesium oxide is preferably very finely ground (i.e., 200 mesh). An example of an acceptable magnesium oxide material is Mag Chem 10-200 (Martin Marietta).

The monoammonium phosphate component, when used in a dry form, should be a technical grade which preferably is more finely ground than the current materials which are used in fire extinguishers. It is also possible to use fertilizer grade monoammonium phosphate if it is finely ground.

It is also possible to utilize monoammonium phosphate/water solutions. The monoammonium phosphate can be initially mixed with tap or potable water prior to mixture with the magnesium oxide component. The amount of monoammonium phosphate in the water solution is not critical, and the concentration will depend on quantity of magnesium oxide to be subsequently mixed therewith or the desired setting speed for the final mixture.

Figure 3:
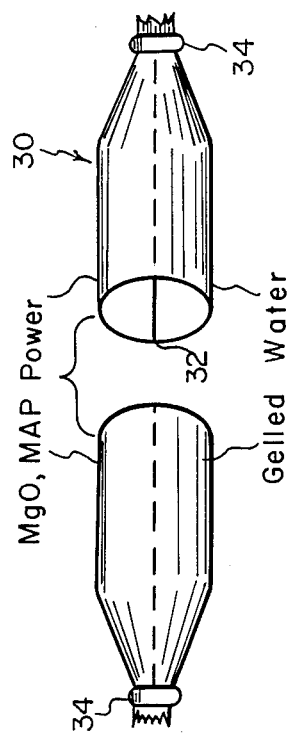
FIGS. 1, 2, 3 and 4 are perspective views of various cartridges according to the invention.
Figure 4:
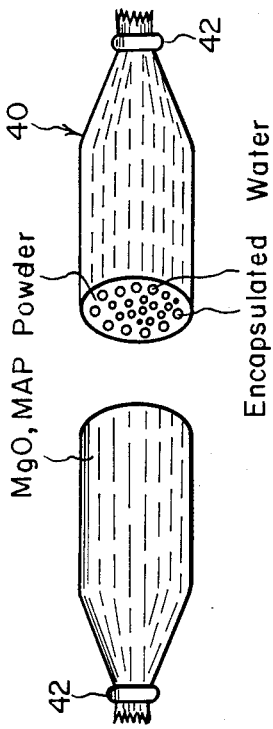
Figure 1:
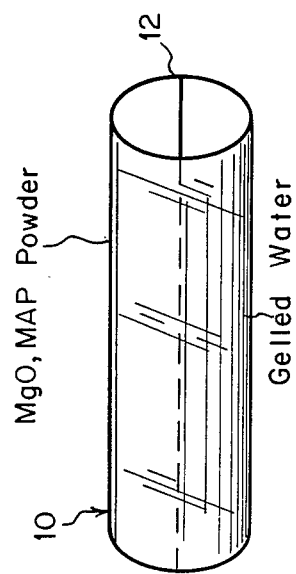
Figure 2:
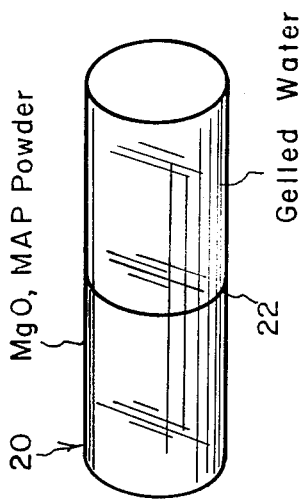

When monoammonium phosphate solutions are used and the cartridge or kit form is desired, the solution can be kept separate from the dry magnesium oxide component as shown in FIGS. 1–3. Gelled MAP/water solutions are also suitable. Also, the solution can be microencapsulated and distributed within the dry magnesium oxide powder as shown in FIG. 4.

The proportions of the monoammonium phosphate and magnesium oxide components must be such that a very rapid set will take place when they are mixed with water. The mixture is successful at the stoichiometric ratio, but generally is composed with a greater amount of magnesium oxide in the mixture as will be illustrated in the examples which follow.

The novel compositions of the invention can be prepared by mixing the desired proportion of dry ingredients with water. The mix can then be poured to form the desired shape. If necessary, the usual ranges of fillers and additives can be used to form cements having a wide variety of properties, all of which are fast setting.

Due to this fast setting ability, the material is particularly useful as a patching compound or as a bonding material for joining anchoring members or elements to structural components or support structures.

One particularly unique ability of the compositions of the invention is that the dry components do not have to be thoroughly mixed with water as do ordinary prior art cements. When making small batches of this cement, such as for roadway patches or for grouting posts, columns, or rods into a hole, aperture, or void in a horizontal, underfoot surface, the following procedure has been found to be particularly successful:

(1) fill the hole or area to be patched approximately ⅓ full of water;
(2) add the dry cementitous mixtures of the invention by pouring it through the water in a manner which is known in the trade as some type of "tremie;"
(3) fill the hole with the cementitous mixture;
(4) remove any excess water; and
(5) allow the mixture to cure.

The mixture then will set within a short period of time to a strong solid cementitous mass.

It is also possible to first fill the hole with the dry powder mixture and then add water to saturate the dry mix.

In other variations on this method, it is possible to use gelled water or encapsulated water instead of tap water, if such alternate water products are desired for particular applications. Either the wet or dry components can be first introduced into the hole, followed by the addition of the remaining component or components.

A further variation of this method contemplates using MAP/water solutions. As above, these solutions can be gelled or microencapsulated, if desired. Either the solution or the dry magnesium oxide can be first introduced into the hole, followed by the remaining components. Those skilled in the art can contemplate numerous other variations which are within the scope of this invention.

The above procedure applies to patching applications. When a strucural component is to be anchored to a horizontal surface, the component can be initially placed in the hole before following the above-described procedure, or it can be rammed into the mixture immediately after the dry materials have been added.

This procedure thus avoids the need for mixing equipment when patching a roadway or, for example, installing a chain link fence wherein the posts are to be cemented in place. All that is necessary is a source of water and the dry cementitous mix. No other tools of any kind are required.

This procedure can be used for any application wherein the water and cement mixture can be maintained in position by the force of gravity. Primarily, this will include floors or similar surfaces, but it may also be used for some out of position work.

Ordinary tap water can be successfully utilized for mixing with the disclosed dry ingredients for most applications. The amount of water to be added will depend on the consistency desired for the cement mix. The consistency should be that of loose plastic, but should be non-sag and not runny.

When the cement is to be applied in other than a flat or horizontal position, it is preferred to use a water product known in the trade as gelled water. The gelled water has a high viscosity and imparts this high viscosity to the cement. Thus, when mixed with the dry components and applied in positions wherein the force of gravity works against it, i.e., vertical or up-side-down surfaces or holes, the gelled water/cement mixture is capable of maintaining its position until it rapidly cures to a final solid product.

Gelled water is produced by mixing any potable water with one or more protein products, known in the trade as "superslurpers". The superslurper must be selected from those that produce a satisfactory gel. Specific ones which may be utilized are described in the examples, however, the invention need not be limited to any particular product.

Gelled water alone, however, will begin to develop bacteria and fungi after a short period of time. This results in a foul smelling and unsightly mix. Also, the growth of these organisms decreases the protein content of the gelled water over time and eventually returns the gelled water to its original liquid state.

When gelled water is used, it is important that a bactericide and/or fungicide compound be added. A commercial product sold under the tradename "Lysol" has been employed for test purposes. In production, however, any active bacteriocide or fungicide ingredient can be added to the gelled water. For example, chlorinated hydrocarbons or various copper or mercury compounds, which are known to those skilled in the bacteriocide art, may also be used.

For repetitive applications which require the joining of an anchoring element to a structure, it is also possible to utilize the fast setting cementitous mixtures of the invention in kit form. The water is generally kept separate from the dry mix until the kit is used.

A preferred kit would thus include separate compartments for the water and dry cement mixture in a cartridge which can be easily shattered to enable the separated components to mix. The cartridge can be shattered or broken by the insertion of the anchoring element, as described previously.

For applications in the flat or horizontal position, ordinary potable water can be used, while for out of position work, gelled water can be used. As mentioned above, to prevent the growth of microorganisms, the gelled water will preferably contain a bactericide or fungicide compound.

When preparing kits according to the invention, a preferred method includes placing a mixture of dry magnesium oxide/monoammonium phosphate into one compartment of a two compartment glass or plastic cartridge and the gelled water containing bacteriocide placed in the other compartment. This cartridge would then be used in the same manner as the cartridges of the prior art described hereinabove. Although optimum results are obtained when the dry ingredients are pre-blended, it is not necessary to preblend in order to achieve the fast setting formulations of the invention. It is also possible to use microencapsulated water as illustrated in U.S. Pat. No. 4,096,844, the content of which is expressly incorporated herein by reference.

The drawing figures show various arrangements of cartridges containing these components. FIG. 1 shows a glass cartridge 10 having a longitudinal interior barrier 12 for separating two compartments; one containing, for example, the dry cementation mixture and the other, gelled water.

FIG. 2 illustrates another glass cartridge 20 wherein the interior barrier 22 separates the components into two cylindrical compartments. As would be understood by those skilled in the art, the design of the compartments is not important to the invention. All that is necessary is that the water and dry mixture (or MgO and MAP/water solution) be separated until the cartridge is inserted into the hole. For this purpose, more than two compartments may be utilized, depending upon the size of the element to be anchored or the amount of cement to be placed into the hole.

FIG. 3 illustrates another embodiment of the invention, which relates to a plastic cartridge 30 having a divider 32, which forms two adjacent longitudinal compartments, and which has sealed ends 34.

FIG. 4. illustrates a single compartment plastic cartridge 40 having sealed ends 42 wherein microencapsulated water is uniformly distributed throughout the dry cementitious mixture of MgO and MAP powder.

The drawing figures show cartridges of glass or plastic because these materials are frangible. By frangible, it is meant that the material can be easily shattered, crushed, destroyed, or dissolved so as to allow the components to mix. Any other frangible material which is capable of maintaining the dry mixture and gelled water separate until introduced into the hole can be used according to the invention.

It is also possible to utilize ordinary cementitious compositions in one compartment of the cartridge while retaining gelled water in the other. The term "cementitious composition," as used herein is intended to mean a composition which generally possesses the characteristics of hardening with water. Such systems includes cements, waterproofing agents, toppings, protective coatings and the like as well as mixtures with aggregates and water such as concrete, mortar, grout and products made therefrom. Of course it is recognized that aggregate or other additives would primarily be used when the cartridges are used to anchor relatively large elements to an aperture of a substrate.

Since ordinary such cementitious compositions generally do not set in a relatively short period of time, it is necessary to add well known accelerator compounds to such compositions, with lithium compounds, various sulfates, such as aluminum sulfate, and certain carbonates of alkali metals being known as accelerators for such compositions, although one skilled in the art is aware of many other compounds which can be used as well to satisfy this requirement. Certain accelerators are disclosed in U.S. Pat. No. 2,339,163. These accelerators enable the cementitious compositions when mixed with the gelled water to more rapidly cure to a solid mass for securely maintaining the element in position in the structure.

It is also possible to utilize, as the accelerator, an alkali metal halide compound. Such a compound causes the gelled water to break down more rapidly, thus making the free water available for a reaction with the cementitious components for curing the composition to a hard mass. Although any of the various alkali metal halides have been found to be effective, the bromides, in particular lithium bromide, have been found to most advantageous in the composition of the invention.

As noted above, it is also possible to utilize cementitious compositions which are known in the art to be fast-setting in the cartridges in this invention. Such fast-setting cementitious compositions include those described in U.S. Pat. Nos. 4,045,237 and 4,157,263, as well as those of U.S. Pat. Nos. 4,012,264 and 4,357,166. One skilled in the art is generally aware of the combinations of aluminous cement, gypsum, and portland cement which are capable of achieving the desired fast-setting properties. As defined above, fast-setting is intended to mean compositions which set in a time between 25 seconds and 10 minutes, preferably between 2 and 5 minutes. Also, those skilled in the art would be capable of varying the components of the cementitious composition to achieve the desired set times. To the extend that such is necessary to complete the disclosure of this application, the content of the preceding four U.S. patents are expressly incorporated by reference herein. When such fast-setting compositions are utilized, the addition of an accelerator compound becomes optional, although in some cases it may be desirable because certain accelerators such as lithium bromide cause the gelled water to break down more rapidly.

As noted aobve, the gelled water enables the mixed components to have a sufficiently high viscosity to be maintained in position until the mixture rapidly cures to a final solid product.

Depending on other factors, a particulate aggregate could be added to the mixture as illustrated in the examples which follow. Aggregates of different particle shapes and sizes as well as different aggregates can also be used.

EXAMPLES

The scope of the invention is further described in connection with the following examples which are set forth for the sole purpose of illustrating the preferred embodiments of the invention and which are not to be construed as limiting the scope of the invention in any manner. In these examples, all parts given are by weight unless otherwise specified.

EXAMPLE 1

A mixture of MAP, MgO, gelled water and sand of the following proportions by weight was prepared.

| | |
|---|---|
| MgO (Mag Chem 10-200) | 350 grams |
| MAP (Agrico Tech Grade) | 150 grams |
| "O" Sand (Morie Co.) | 500 grams |
| $H_2O$ | 100 grams |

The foregoing compound had a set time of 1 minute 45 seconds. Two minutes after set, this compound exhibited a compression strength of 3,000 psi; after 10 minutes, 3,650 psi; and after 24 hours, 6,300 psi.

EXAMPLE 2

The following mix was prepared.

| | |
|---|---|
| MgO (Mag Chem 10-200) | 700 grams |
| MAP (Agrico Tech Grade) | 300 grams |
| $H_2O$ | 100 grams |

The foregoing compound had a set time of 25 seconds but produced violent foaming, boiling and steaming.

EXAMPLE 3

A cementitious mixture was prepared as follows:

| | |
|---|---|
| MgO (Mag Chem 10-200) | 360 grams |
| MAP (Agrico Tech Grade) | 390 grams |
| "O" Sand (Morie Co.) | 750 grams |
| $H_2O$ | 150 grams |

The foregoing compound had a set time of 4 minutes. A compression strength of 2,250 psi was exhibited 2 minutes after set and compression strength of 2500 psi was exhibited 10 minutes after set.

EXAMPLE 4

The following mix was prepared.

| | |
|---|---|
| MgO (Mag Chem 10-200) | 210 grams |
| MAP (Agrico Tech Grade) | 540 grams |
| "O" Sand (Morie Co.) | 750 grams |
| $H_2O$ | 170 grams |

The foregoing compound had a set time of $8\frac{1}{2}$ minutes.

EXAMPLE 5

| | |
|---|---|
| MgO (Mag Chem 10-200) | 600 grams |
| MAP (Agrico Tech Grade) | 150 grams |
| "O" Sand (Morie Co.) | 750 grams |
| $H_2O$ | 150 grams |

The foregoing compound has a set time of less than 40 seconds, but began to flash during mixing.

As illustrated by the preceding examples, various setting times can be achieved by changing the ratio of MgO:MAP.

The following example relates to the preparation of gelled water.

EXAMPLE 6

| | |
|---|---|
| $H_2O$ | 500 grams |
| Propylene glycol | 1.5 grams |
| SGP 502S | 3 grams |

SGP 502S is a superslurper material which is available from Henkel Corporation, Minneapolis, Minn.

Throughly blended, this yielded a mix with the consistency of petroleum jelly. When mixed with the dry blend of Example 2, a set time of 1½ minutes was obtained and the strength 2 minutes after set time was over 2,000 psi.

EXAMPLE 7

The $H_2O$ polymer mixture without preservative as a control and one with preservative were made up and left to age. After one week, both mixes exhibited fungal growth and related viscosity reduction. Mixes with propylene glycol did, however, show less contamination.

EXAMPLES 8-9

Formulation 8

| | |
|---|---|
| $H_2O$ | 500 grams |
| SGP 502S | 3 grams |
| "Lysol" | 2.5 grams |

Formulation 9

| | |
|---|---|
| $H_2O$ | 500 grams |
| SGP 502S | 3 grams |
| "Lysol" | 5 grams |

Control

| | |
|---|---|
| $H_2O$ | 500 grams |
| SGP 502S | 3 grams |

Lysol was used because the active ingredient is phenylphenol, an excellent fungicide and bactericide. The control mix was made without Lysol.

At the end of 16 days, storage contamination was apparent in the control sample. No such growth was visible in either formulation 8 or 9, which each contain Lysol. The viscosity of the Lysol samples remained stable.

After 23 days, the control was infested with fungal colonies and exhibited complete loss of viscosity. Formulation 8 showed signs of slight contamination and viscosity reduction. Formulation 9 showed no contamination whatever and remained viscosity stable.

EXAMPLE 10

The gelled water of Formulation 9 of Example 9 was then mixed with the dry ingredients of Example 1. The resulting mixture had a set time of 1 minute 40 seconds and a compression strength of 2800 psi at 2 minutes after set, a compression strength of 3,500 psi at 10 minutes after set and a compression strength of 6,250 psi after 24 hours.

EXAMPLE 11

Although all the previous work has been done with SGP 502S, the following additional gelled water materials were evaluated:

"Water Gel" from Musser Forest, Inc.

"Water Lock J 500" from Grain Processing Corporation

"Viterra 2" from Nepera Chemical Company

"SG-4" from Industrial Services International

"Magic Water Gel" from Super Absorant Company.

All of these materials produced satisfactory gelling and when mixed with the dry blend of Example 2, produced results essentially similar to SGP 502S.

While it is apparent that the invention herein disclosed is well calculated to fulfill the objects above stated, it will be appreciated that numerous modifications and embodiments may be devised by those skilled in the art, and it is intended that the appended claims cover all such modifications and embodiments as fall within the true spirit and scope of the present invention.

What is claimed is:

1. A cartridge for securing an anchor element in an aperture of a structure which comprises a casing of a frangible material having at least two separate compartments, at least one of which contains a dry mixture of monoammonium phosphate and magnesium oxide and at lest one of which contains gelled water comprising water, a protein product and a bactericide or fungicide compound.

2. The cartridge of claim 1 wherein the magnesium oxide and monoammonium phosphate are each in the form of finely group powder.

3. The cartridge of claim 1 wherein the relative amounts of magnesium oxide to monoammonium phosphate ranges fro mabout 4:1 to 1:2.

4. A method for securing an anchoring element to a structure which comprises:

(a) providing an aperture in a structure;

(b) configuring a cartridge comprising a casing of a frangible material having at least two separate compartments, at least one of which contains a dry mixture of monoammonium phosphate and magnesium oxide and at least one of which contains gelled water comprising water, a protein product and a bactericide or fungicide compound, of a suitable size to fit into said aperture;

(c) inserting said cartridge into said aperture;

(d) inserting an anchoring element into said aperture to break, puncture, crush, destroy or dissolve said cartridge, thus allowing components in the cartridge compartments to mix; and (e) allowing said mixture to cure and securely attach said anchoring element to said structure.

5. A cartridge for securing an anchor element in an aperture of a structure which comprises a casing of frangible material having two separate compartments, one of which contains monoammonium phosphate and magnesium oxide, each in the form of a finely group powder of a particle size which passes through #200 mesh and wherein the relative amounts of magnesium oxide to monoammonium phosphate ranges from about 1:1 to about 4:1, and the other compartment containing gelled water comprising water, a protein product and a bactericide or fungicide compound.

6. A method for securing an anchoring element to a structure which comprises:

(a) providing an aperture in a structure;

(b) configuring a cartridge comprising a casing of frangible material having two separate compartments, one of which contains monoammonium phosphate and magnesium oxide, each in the form of a finely ground powder of a particle size which passes through #200 mesh and wherein the relative amounts of magnesium oxide to monoammonium phosphate ranges from about 1:1 to about 4:1, and the other compartment containing gelled water comprising water, a protein product and a bactericide or fungicide compound, of a suitable size to fit into said aperture;
(c) inserting said cartridge into said aperture;
(d) inserting an anchoring element into said aperture to break, puncture, crush, destroy or dissolve said cartridge, thus allowing components in the cartridge compartments to mix; and
(e) allowing said mixture to cure and securely attach said anchoring element to said structure.

7. A cartridge for securing an anchor element in an aperture of a structure which comprises a casing of a frangible material having two separate compartments, one of which contains a dry cementitious composition and an accelerator compound which imparts fast setting properties to the composition and the other compartment containing gelled water comprising water, a protein product and a bactericide or fungicide compound.

8. The cartridge of claim 7 wherein the cementitious composition is portland cement, a high alumina cement, gypsum or mixtures thereof.

9. The cartridge of claim 7 wherein the accelerator compound is an alkali metal halide.

10. The cartridge of claim 9 wherein the alkali metal halide is lithium bromide.

11. The cartride of claim 7 wherein the cementitious composition is in the form of a finely ground powder having a particle size which passes through #200 mesh.

12. A cartridge for securing an anchor element in an aperture of a structure which comprises a casing of a frangible material having two separate compartments, one of which contains a dry, fast-setting cementitious composition and the other compartment containing gelled water comprising water, a protein product and a bactericide or fungicide compound.

13. The cartridge of claim 12 wherein the fast-setting cement composition comprises a combination of two or more of magnesium phosphate, high alumina cement, portland cement and gypsum.

14. The cartridge of claim 12 wherein the cement coposition sets between about 25 seconds and minutes after contacting water.

15. The cartridge of claim 12 wherein the cementitious composition is in the form of a finely ground powder having a particle size which passes through #200 mesh.

16. The cartridge of claim 12 wherein the cementitions composition further comprises an accelerator compound.

17. The cartridge of claim 16 wherein the accelerator is an alkali metal halide.

18. The cartridge of claim 17 wherein the accelerator is lithium bromide.

19. A cartridge for securing an anchor element in an aperture of a structure which comprises a casing of a frangible material having two separate compartments, at least one of which contains a fast-setting cementitious composition which sets in a time of between about 2 and 5 minutes and at least one compartment containing gelled water comprising water, a protein product and a bactericide or fungicide compound.

20. The cartridge of claim 19 wherein the fast-setting cement composition comprises a combination of two or more of magnesium phosphate, high alumina cement, portland cement and gypsum.

21. The cartridge of claim 19 wherein the cementitious composition is in the form of a finely ground powder having a particle size which passes through #200 mesh.

22. The cartridge of claim 19 wherein the cementitious composition further comprises an accelerator compound.

23. The cartridge of claim 22 wherein the accelerator is an alkali metal halide.

24. The cartridge of claim 23 wherein the accelerator is lithium bromide.

25. A method for securing an anchoring element to a structure which comprises:
(a) providing an aperture in a structure;
(b) configuring a cartridge comprising a casing of a frangible material having two separate compartments, one of which contains a dry cementitious composition and an accelerator compound which imparts fast setting properties to the composition and the other compartment containing gelled water comprising water, a protein product and a bactericide or fungicide compound, of a suitable size to fit into said aperture;
(c) inserting said cartridge into said aperture;
(d) inserting an anchoring element into said aperture to break, puncture, crush, destroy or dissolve said cartridge, thus allowing components in the cartridge compartments to mix; and
(e) allowing said mixture to cure and securely attach said anchoring element to said structure.

26. The method of claim 25 wherein the dry ingredients of the cartridge contain an accelerator compound for increasing the release of water from the gelled water when the components are mixed.

27. The method of claim 26 wherein the accelerator is a bromide compound.

28. A method for securing an anchoring element to a sturcture which comprises:
(a) providing an aperture in a structure;
(b) configuring a cartridge comprising a casing of a frangible material having two separate compartments, one of which contains a dry, fast-setting cementitious composition and the other compartment containing gelled water comprising water, a protein product and a bactericide or fungicide compound, of a suitable size to fit into said aperture;
(c) inserting said cartridge into said aperture;
(d) inseting an anchoring element into said aperture to break, puncture, crush, destgroy or dissolve said cartridge, thus allowing components in the cartridge compartments to mix; and
(e) allowing saids mixture to cure and securely attach said anchoring element to said structure.

29. The method of claim 28 wherein the dry imgredients of the cartridge contain an accelerator compound for increasing the release of water from the gelled water when the components are mixed.

30. The method of claim 27 wherein the accelerator is a bromide compound.

31. A method for securing an anchoring element to a structure which comprises:
(a) providing an aperture in a structure;
(b) configuring a cartridge comprising a casing of a frangible material having two separate compartments, at least one of which contains a fast-setting cementitious which sets in a time of between about 2 and 5 minutes and at least one compartment containing gelled water comprising water, a protein product and a bactericide or fungicide compound, of a suitable size to fit into said aperture;
(c) inserting said cartridge into said aperture;

(d) inserting an anchoring element into said aperture to break, puncture, crush, desctroy or dissolve said cartridge, thus allowing components in the cartridge compartment to mix; and (e) allowing said mixture to cure and securely attach said anchoring element to said strucutre.

32. The cartridge of claim 31 wherein the dry ingredients of the cartridge contain an accelerator compound for increasing the release of water from the gelled water when the components are mixed.

33. The method of claim 32 wherein the accelerator is a bromide compound.

* * * * *